United States Patent [19]

Stuart et al.

[11] 3,825,834

[45] July 23, 1974

[54] DIGITAL SSB TRANSMITTER

[75] Inventors: Richard Stuart; Arvind M. Bhopale, both of Belts, Md.

[73] Assignee: Rixon Eleronics, Inc., Silver Spring, Md.

[22] Filed: July 5, 1972

[21] Appl. No.: 269,047

[52] U.S. Cl. .................. 325/137, 307/261, 325/138, 328/14, 332/44, 332/45

[51] Int. Cl. .................................................. H04b 1/02

[58] Field of Search ............ 325/38 R, 38 A, 49, 50, 325/137, 138, 329, 330; 332/44, 45; 328/14; 307/261, 266; 235/197

[56] References Cited

UNITED STATES PATENTS

| | | | |
|---|---|---|---|
| 3,522,537 | 8/1970 | Boughtwood | 325/38 R |
| 3,605,017 | 9/1971 | Chertok et al. | 325/60 |

*Primary Examiner*—Robert L. Griffin
*Assistant Examiner*—Marc E. Bookbinder
*Attorney, Agent, or Firm*—Larson, Taylor & Hinds

[57] ABSTRACT

A digital single sideband transmitter for data modems including a digital filter which shapes the incoming binary data into two outputs in the form of equally delayed Inverse Fourier and Hilbert transforms of a near ideal lowpass filter. These outputs are respectively multiplied in analog multipliers by inphase and quadrature components of the carrier as produced by a sine-cosine generator. The outputs of the multipliers are then summed to produce a modulated single sideband signal. The digital filter serves to delay, truncate and shape the response using a shaping or window function of the general form $K_0 - K_1 \cos[(\pi/T)t]$ where $K_0$ and $K_1$ are constants and the function exists for the truncated period $t = 0$ to $2T$.

4 Claims, 6 Drawing Figures

FIGURE I

DIGITAL SSB TRANSMITTER

FIELD OF THE INVENTION

The present invention relates to single sideband transmitters for data communication systems and, more particularly, to a digital single sideband transmitter.

BACKGROUND OF THE INVENTION

Single sideband transmitters for data modems characteristically include a plurality of filters as well as other shaping and delay networks. For example, many conventional modems utilize a shaping filter, a vistigial sideband filter and a phase equalizer in the data transmitter. These networks are, in addition to being expensive, relatively difficult to control insofar as a precise time response is concerned. Hence, given the ever present desire to reduce the hardware required in data communications systems, any transmitter wherein such networks are eliminated has obvious advantages as compared with prior art transmitters.

A technique of interest in this regard is that described in the article "The Phase Shift Method of SSB Generation" by Donald E. Norgaard in the December 1956 issue of the Proceedings of the I.R.E., Volume 44, pages 1,718 to 1,735. The technique involves multiplication (balanced modulation) of a baseband signal, $f(t)$, and the Hilbert transform, $\hat{f}(t)$, of the baseband signal, by the inphase and quadrature phase carrier signals, respectively, and summing of the modulated signals to produce a SSB signal. Reference is also made to U.S. Pat. No. 3,605,017.

SUMMARY OF THE INVENTION

In accordance with the present invention, there is provided an improved single sideband transmitter for data modems. Among other advantages, the transmitter of the invention provides better control over time response as well as reduction of the necessary hardware as compared with that required by conventional transmitters. The system also provides the capability of synthesizing controlled time response.

According to a presently preferred embodiment, a single sideband (SSB) transmitter is provided that includes a single digital shaping filter which converts the binary data input thereto into first and second outputs respectively comprising equally delayed Inverse Fourier and Hilbert transforms of the frequency response of a substantially ideal low pass filter, and a sine-cosine generator for producing cosine and sine wave outputs corresponding respectively to inphase and quadrature components of the carrier. By multiplying the Fourier output of the digital filter by the cosine wave signal and the Hilbert output by the sine wave signal and then summing the resultant outputs of the multipliers, a single sideband suppressed carrier modulated signal is produced. The digital filter serves to delay, truncate and shape the response using a shaping or window function of the general form $K_o - K_1 \cos[(\pi/T)t]$ where $K_0$ and $K_1$ are constants and the function exists for the truncated period $t = 0$ to $2T$. The technique of generating the waveforms discussed above is more efficient and more flexible than the prior art techniques and the waveforms generated are different.

The carrier clock for the sine generator is produced by dividing the output frequency of a master oscillator by a first factor, M, the resultant signal being further divided by a factor M1 to produce the square wave input to the sine-cosine generator. Similarly, the master oscillator frequency is divided by a factor N to produce the digital filter clock and this signal is divided again by a factor N1 to produce a data clock signal for the data encoder. The division ratios M, M1, N, and N1 satisfy the relationship:

$fcMM1 = fdNN1 = fosc$ where $fc$ and $fd$ are the carrier frequency and data rate, respectively. The data transmission rate can be changed as long as the ratio of the data clock to the digital filter clock is held constant.

Once the data rate and the carrier frequency are selected the carrier frequency maintains this same ratio for any master oscillator frequency.

The digital shaping filter and sine-cosine generator each comprise a plurality of serially connected shift registers and first and second resistor ladder networks for forcing the output to the desired response.

Other features and advantages of the invention will be set forth in or apparent from the detailed description of a preferred embodiment set forth hereinbelow.

DESCRIPTION OF A PREFERRED EMBODIMENT

Figure 1:
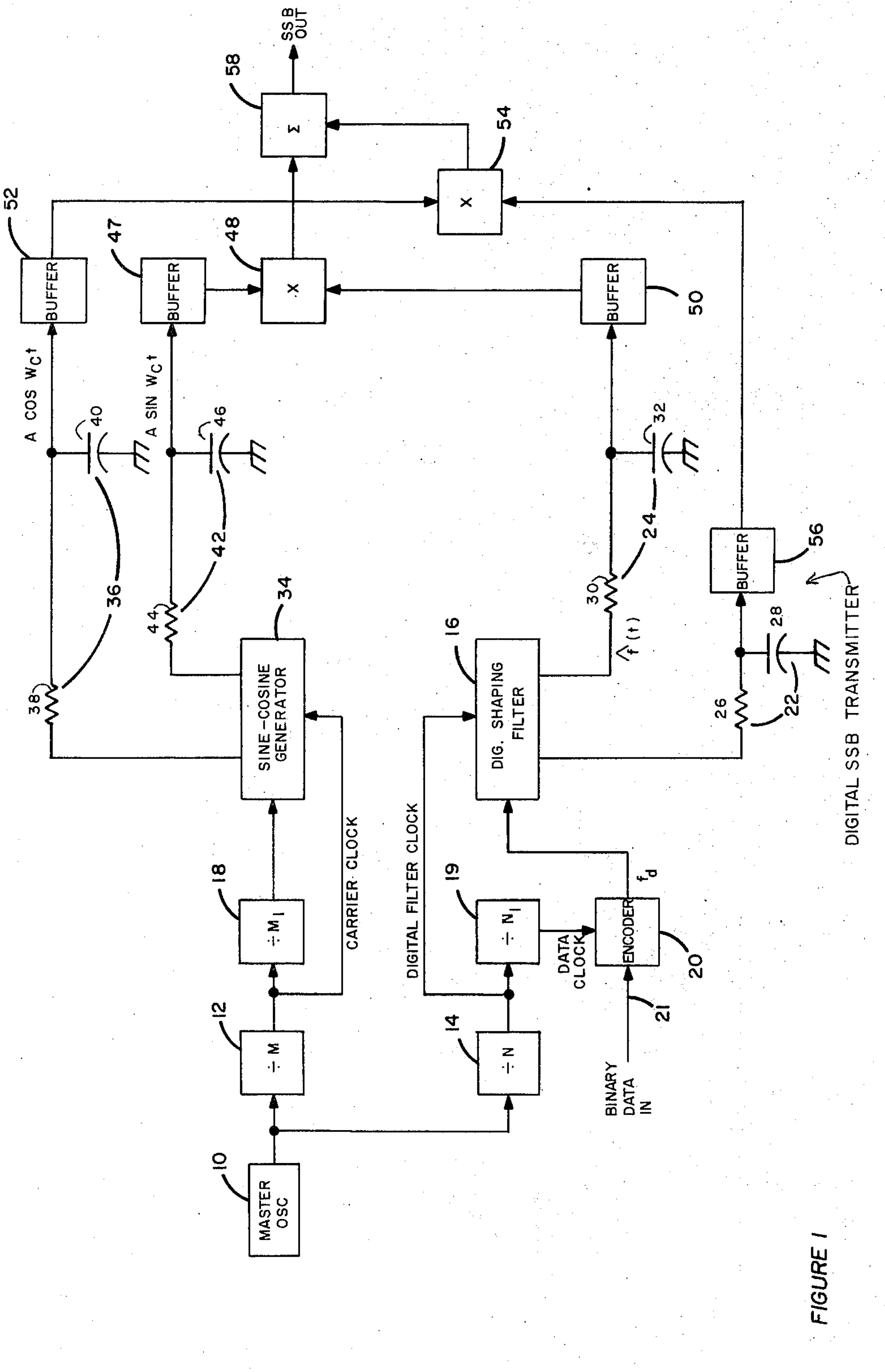
FIG. 1 is a schematic block diagram of a digital single sideband transmitter in accordance with a presently preferred embodiment of the invention.

Referring to FIG. 1, a digital single sideband transmitter in accordance with the presently preferred embodiment of the invention includes a master oscillator 10 which produces a frequency output which is divided by M in the first divider 12 to produce the carrier clock frequency and by N in a second divider 14 to produce a clock frequency for a digital shaping filter 16 described hereinbelow. The output of divider 12 is divided by M1 in a further divider 18 to produce a carrier frequency $fc$. Similarly, the output of divider 14 is divided by N1 in a further divider 19 to produce a data clocking frequency for a data encoder 20. Encoder 20, under the control of this data clock, operates on the incoming binary data stream, indicated at 21, to produce an output having a data frequency or rate $fd$.

The division ratios M, M1, N and N1 are chosen to satisfy the relationship $fcMM1 = fdNN1 = fosc$, where $fc$ and $fd$, as stated, are the carrier frequency and the data rate, respectively, and $fosc$ is the frequency of master oscillator 10.

Figure 2:
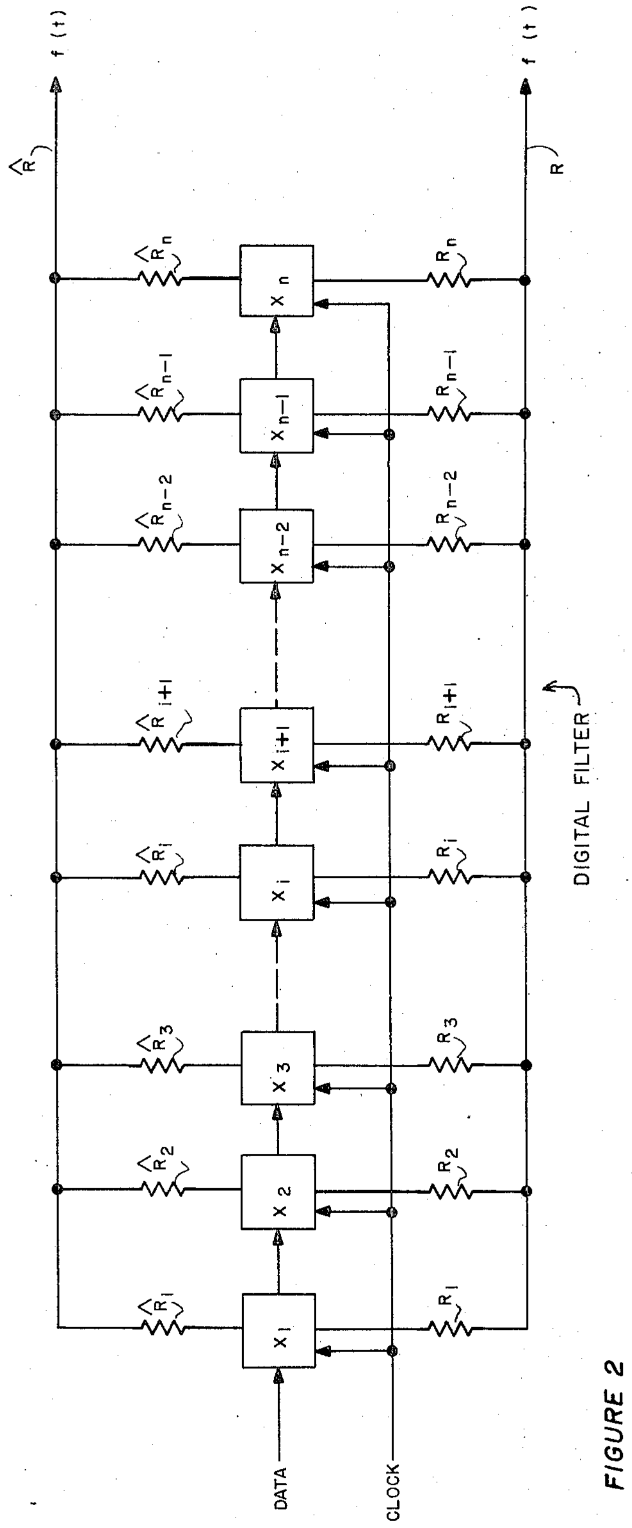
FIG. 2 is a schematic circuit diagram of the digital filter of FIG. 1.
Figure 4:
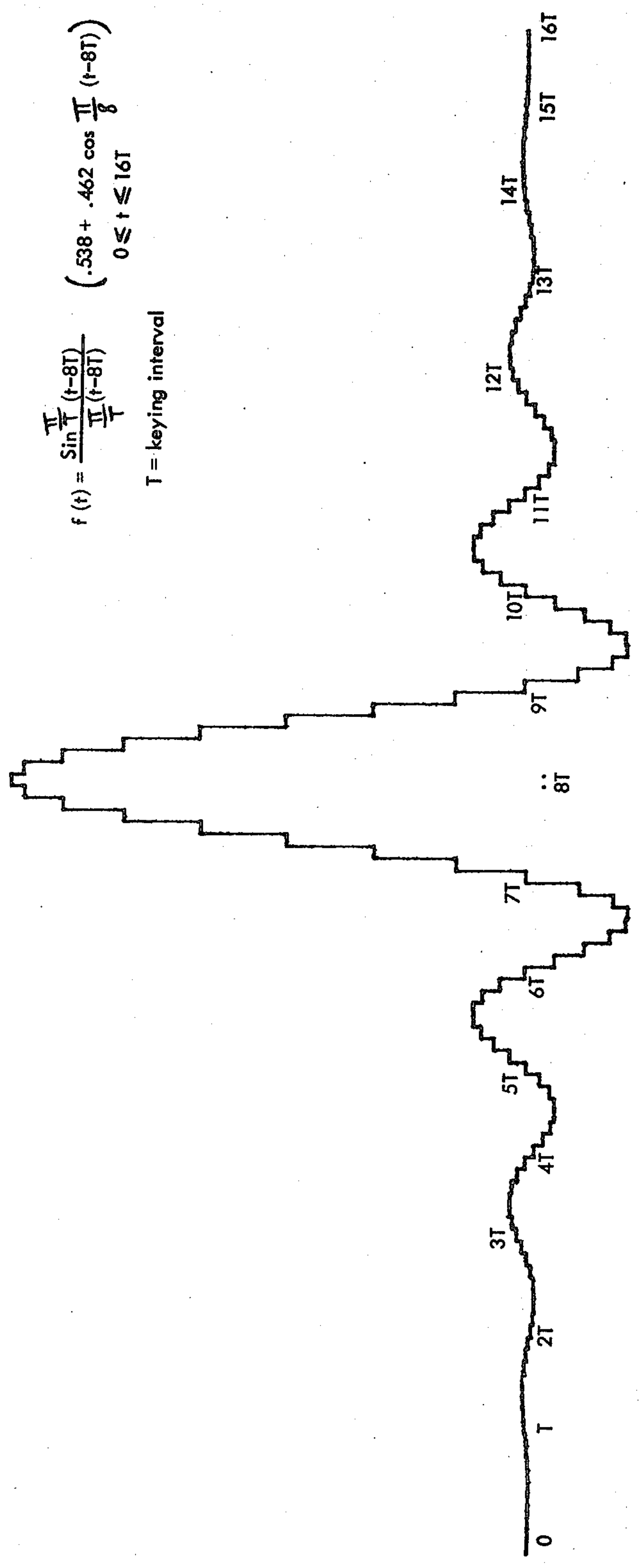
FIGS. 4 to 6 are voltage waveforms used in explaining the operation of the transmitter of FIG. 1.
Figure 5:
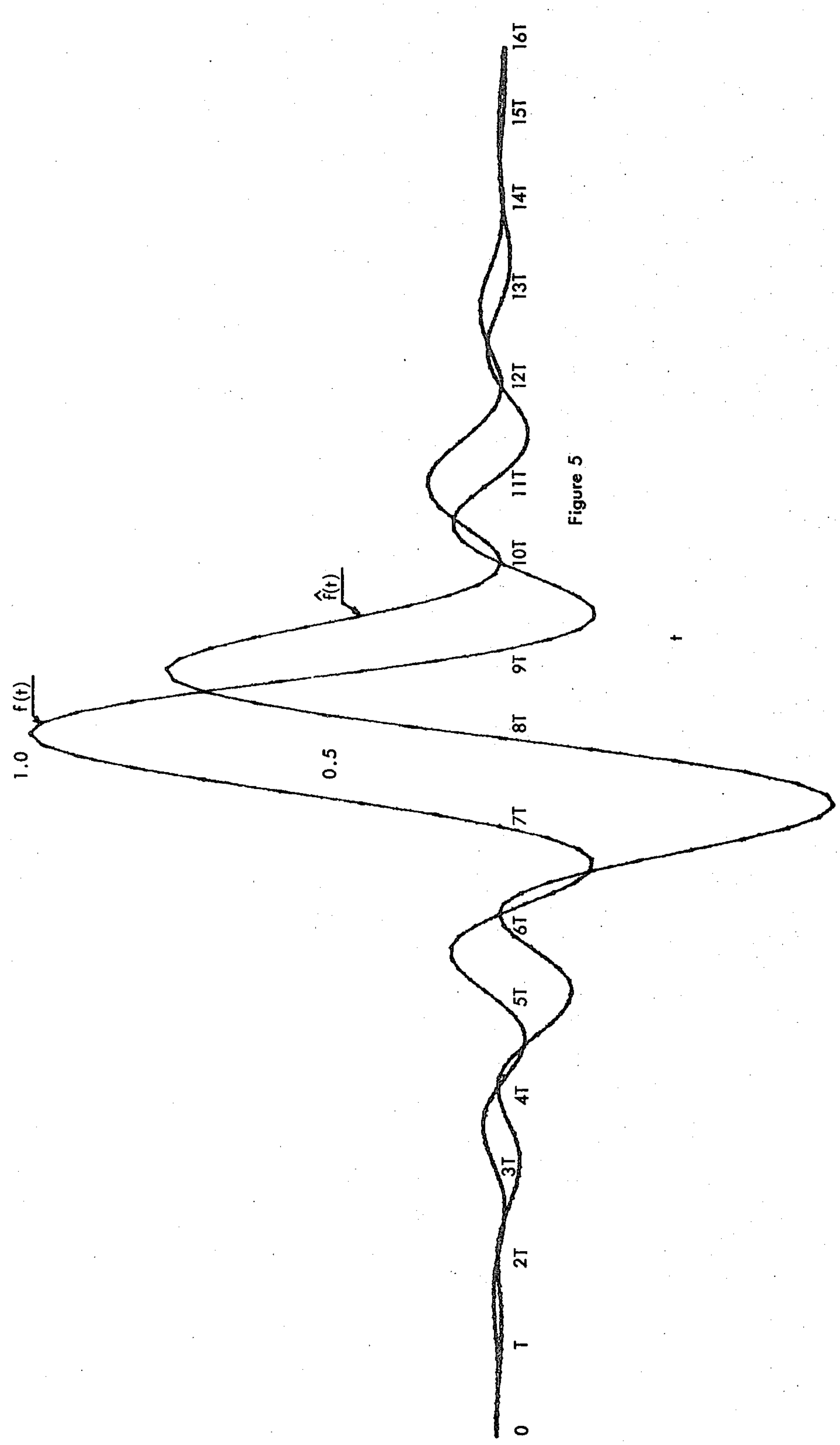
Figure 6:
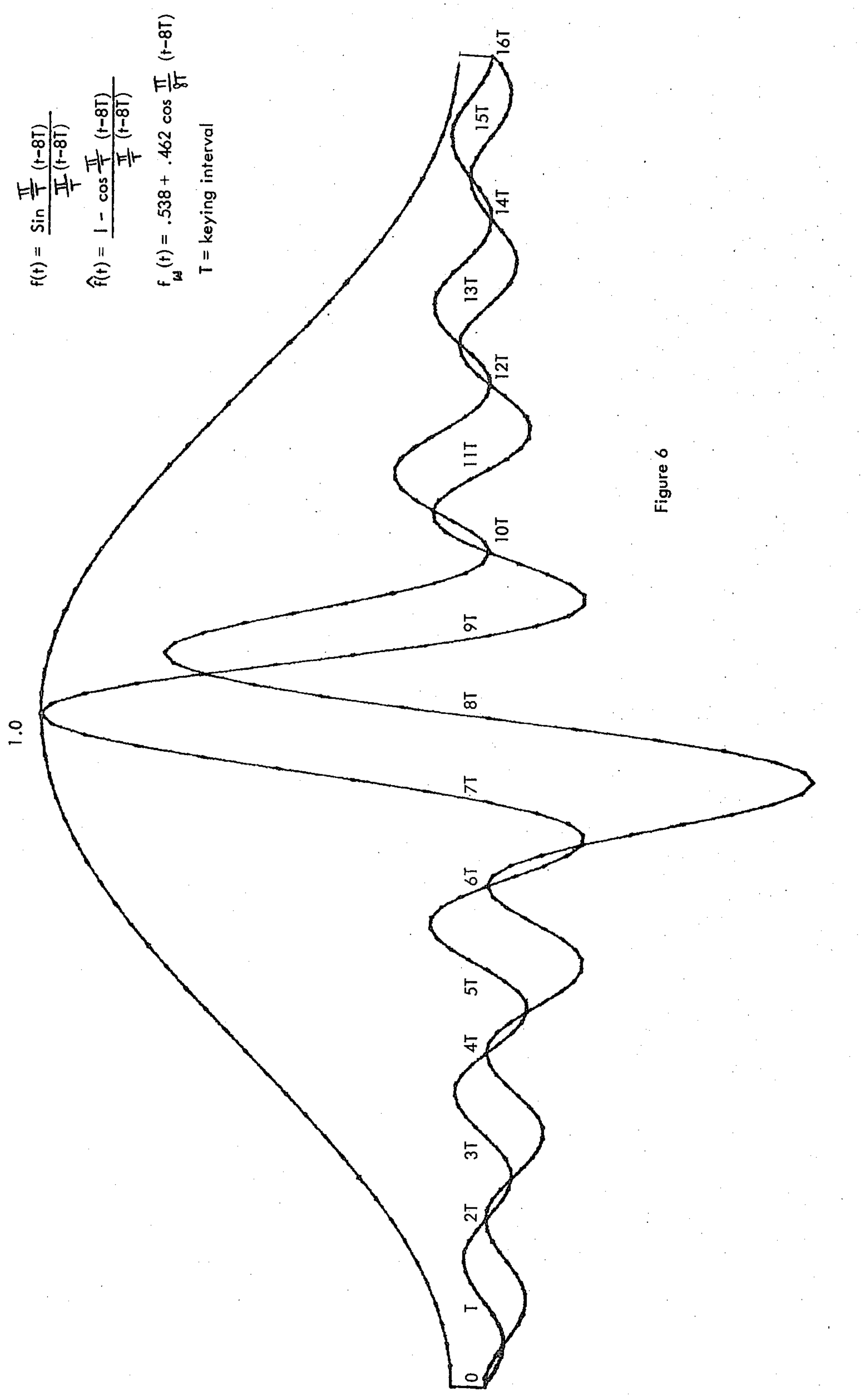

Digital shaping filter 16 mentioned hereinabove is shown in more detail in FIG. 2. The digital shaping filter 16 is of the type described in our co-pending application Ser. No. 269,048, entitled Multilevel Digital Filter filed concurrently herewith and reference is made to that application for additional description of such a filter. As shown in FIG. 2, the digital filter 16 comprises a chain or series of shift registers or register stages X1, X2, X3, .... Xi + 2, .... $Xn - 1$, $Xn$, having a common clock, the output of encoder 20 being connected to the first register X1 and the clock frequency output of divider 14 being connected to each of the registers. The output of each shift register X1 and X*n* is weighted by two different resistor ladder networks, one of which forces the time response to be the Inverse Fourier transform of a near ideal low-pass filter and the other of which forces the time response to be the Inverse Hilbert transform of such a filter. More specifically, as illustrated, the output of each shift register X1 to X*n* is weighted by a first ladder network formed by a first series of resistors R1 to R*n* individually connected between a corresponding register X1 to X*n* and a common output connection R and a second ladder network formed a second series OF resistors R̂1 to R̂*n* individually connected between a corresponding register X1 to Xn and a common output connection R̂. The values of the resistors of the ladder network formed by resistors R1 to R*n* are chosen such as to, as stated above, force the time response of the filter 16 to be the Inverse Fourier transform of an ideal low pass filter whereas, similarly, the values of resistors R̂1 to R̂*n* of the second ladder network are chosen to force the time response of filter 16 to be the Inverse Hilbert transform of a near ideal low pass filter. The values of the resistors R1 to R*n* and R̂1 to R̂*n* for an exemplary embodiment are given in the table found at the end of this specification. The digital filter 16 serves to delay, shape and truncate the response using a shaping or window function of the general function $K_o - K_1 \cos [\pi/tT]$ where $K_o$ and $K_1$ are constants and the function exists for the period $t = 0$ to $2T$. The optimum values for $K_o$ and $K_1$ have been found to be 0.538 and 0.462. The $f(t)$ output is shown in FIG. 4 and is of a truncated sin$x/x$ form, the spectrum of which closely approximates and ideal low-pass filter characteristic. It will be appreciated from FIG. 4 that the respective outputs $f(t)$, as well as $\hat{f}(t)$, are both step approximations *fo* the desired time responses and for this reason R-C filters R-C filters 22 and 24, formed respectively by resistor 26 and a capacitor 28 and a resistor 30 and a capacitor 32, are provided to smooth these outputs and hence produce a smooth analog waveform. The smoothed outputs $f(t)$ and $\hat{f}(t)$ are shown in FIG. 5. The pulse responses $f(t)$ and $\hat{f}(t)$ shown in FIG. 5 are the result of modification of the truncated sin$x/x$ and $(1 - \cos x)/x$ waveforms using the window function referred to the above. These responses $f(t)$ and $\hat{f}(t)$, and the window function $f_w(t)$ are shown in FIG. 6.

Figure 3:
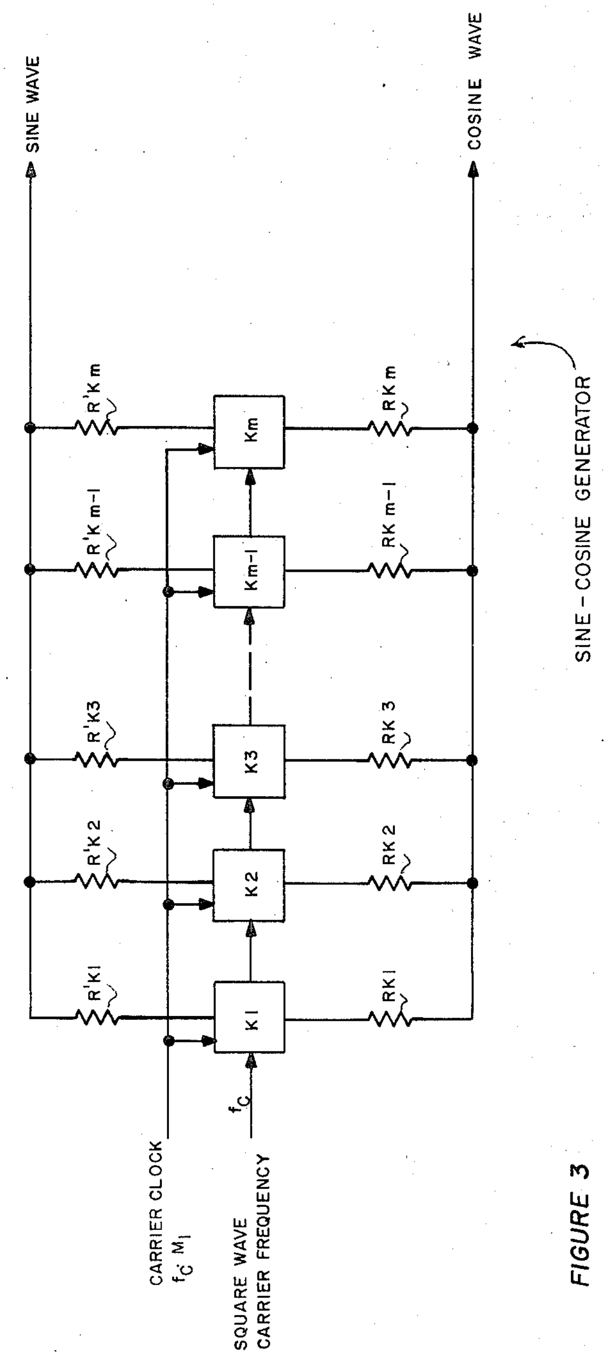
FIG. 3 is a schematic circuit diagram of the sine-cosine generator of FIG. 1.

The outputs of divider 18 and divider 12, respectively, form the carrier frequency, *fc*, and clock frequency, *fc*.M1, for a sine-cosine generator 34. Sine-cosine generator 34, as shown in FIG. 3 and similarly to the digital filter discussed above, comprises a chain of shift registers K1 to K*m*, the output of divider 18 being connected to the first register $K_1$ and the output of divider 12 providing a common clock frequency. It will be appreciated that in contrast to the encoded data input to the filter of FIG. 2 the input register K1 is a square wave, equivalent to a 10101 ... data pattern. The number of shift registers, denoted m, is always equal to one-half of the carrier clock to carrier frequency ratio, that is $m = m1 \div 2$. The outputs of shift registers K1 to K*m* are weighted by a first resistor ladder network R*k* formed by resistors R*k*1 to R*km* and a second ladder network R'*k* formed by resistors R'*k*1 to R'*km* as illustrated. The resistor values of the ladder network Rk are chosen to force the response to be a cosine wave and are related by the relationship $$R_{k_i} = 1/(x_{i+1} - X_i) \qquad \text{for } i = 1 \text{ to } m$$

wherein R*k*1, R*k*2, R*k*3. . . R*km* are the resistor values and X1, X2, X3, ... X2*m* equi-spaced sample values of the cosine wave. A similar set of resistor values are used for the ladder network R'*k* and force the response to be a sine wave. The cosine waveform output of ladder network R*k* is passed through an R-C filter 36, formed by a resistor 38 and a capacitor 40, while the sine waveform output of network R'*k* is passed through an R-C network 42, formed by a resistor 44 and a capacitor 46, so that smooth cosine and sine waves are produced.

As shown in FIG. 1, the sine wave output of sine-cosine generator 34, which is of the form $A \sin \omega c t$, serves after being passed by buffer amplifier 47, as a first input to a multiplier or product modulator 48. The Hilbert response, $\hat{f}(t)$, of digital shaping filter 16, after amplification in a buffer amplifier 50, forms the second input. Similarly, the cosine wave output of sine-cosine generator 34, which is of the form $A \cos \omega_c t$ serves after being passed through a buffer amplifier 52, first input of a second multiplier or product modulator 54 and the Fourier response $f(t)$, of digital filter 16, after amplification in a further buffer amplifier 56, forms the second input. The outputs of multipliers 48 and 54 are summed in a summing amplifier 58 to form a single-sideband modulated signal. By forming the Inverse Fourier and Hilbert transform responses of a near ideal low-pass filter to the encoder output, multiplying these outputs, respectively, by the cosine and sine waveforms of the carrier frequency, and summing the products of this multiplication, the upper sideband components cancel and the lower sideband components add so that the result is, as stated, a suppressed carrier modulated single sideband signal.

As stated hereinabove, the data transmission rate of the system can be changed as long as the ratio of the data clock frequency to the digital filter clock frequency is held constant. The carrier frequency can be changed by changing the ratio between the frequency of the master oscillator 10 and the carrier frequency. Also, as stated, once the ratio between the data rate and the carrier frequency is selected, the carrier frequency then maintains this same ratio for any master oscillator frequency. The resistor values $R_1$ to $R_n$ and $\hat{R}_1$ to $\hat{R}_n$ in a typical example are given below:

| | Resistor values | | Resistor values |
|---|---|---|---|
| $R_1$ | open | $R_{64}$ | 12.0K |
| $R_2$ | −1224.8K | $R_{65}$ | 14.7K |
| $R_3$ | −1333.5K | $R_{66}$ | 19.9K |
| $R_4$ | −1702.0K | $R_{67}$ | 32.1K |
| $R_5$ | −3032.9K | $R_{68}$ | 77.3K |
| $R_6$ | 13298 K | $R_{69}$ | −345.1K |
| $R_7$ | 2394.5K | $R_{70}$ | −65.8K |
| $R_8$ | 1192.5K | $R_{71}$ | −43.1K |
| $R_9$ | 823.5K | $R_{72}$ | −37.4K |
| $R_{10}$ | 1529.2K | $R_{73}$ | −38.2K |
| $R_{11}$ | 1279.8K | $R_{74}$ | −47.0K |
| $R_{12}$ | 1335.5K | $R_{75}$ | −66.9K |
| $R_{13}$ | 1895.2K | $R_{76}$ | −133.9K |
| $R_{14}$ | 7836.9K | $R_{77}$ | −21475.6K |
| $R_{15}$ | −2497.4K | $R_{78}$ | 158.4K |
| $R_{16}$ | −1031.6K | $R_{79}$ | 92.0K |
| $R_{17}$ | −680.7K | $R_{80}$ | 75.6K |
| $R_{18}$ | −384.3K | $R_{81}$ | 75.0K |
| $R_{19}$ | −388.6K | $R_{82}$ | 81.5K |
| $R_{20}$ | −473.0K | $R_{83}$ | 112.7K |
| $R_{21}$ | −815.8K | $R_{84}$ | 215.4K |

-Continued

| | Resistor values | | Resistor values |
|---|---|---|---|
| $R_{22}$ | 54882.3K | $R_{85}$ | 3462.7K |
| $R_{23}$ | 680.4K | $R_{86}$ | −281.6K |
| $R_{24}$ | 342.8K | $R_{87}$ | −156.4K |
| $R_{25}$ | 243.2K | $R_{88}$ | −125.7K |
| $R_{26}$ | 250.8K | $R_{89}$ | −122.4K |
| $R_{27}$ | 247.8K | $R_{90}$ | − 156.6K |
| $R_{28}$ | 298.0K | $R_{91}$ | −218.2K |
| $R_{29}$ | 512.1K | $R_{92}$ | −428.9K |
| $R_{30}$ | −30835.6K | $R_{93}$ | −30835.6K |
| $R_{31}$ | −428.9K | $R_{94}$ | −512.1K |
| $R_{32}$ | −218.2K | $R_{95}$ | −298.0K |
| $R_{33}$ | −156.6K | $R_{96}$ | −247.8K |
| $R_{34}$ | −122.4K | $R_{97}$ | −250.8K |
| $R_{35}$ | −125.7K | $R_{98}$ | −243.2K |
| $R_{36}$ | −156.4K | $R_{99}$ | 342.8K |
| $R_{37}$ | −281.6K | $R_{100}$ | 680.4K |
| $R_{38}$ | −346.2K | $R_{101}$ | 54882.3K |
| $R_{39}$ | −215.4K | $R_{102}$ | −815.8K |
| $R_{40}$ | −112.7K | $R_{103}$ | −473.0K |
| $R_{41}$ | −81.5K | $R_{104}$ | −388.6K |
| $R_{42}$ | −75.0K | $R_{105}$ | −384.3K |
| $R_{43}$ | −75.6K | $R_{106}$ | −680.7K |
| $R_{44}$ | −92.0K | $R_{107}$ | −1031.6K |
| $R_{45}$ | −158.4K | $R_{108}$ | −2497.4K |
| $R_{46}$ | −21475.6K | $R_{109}$ | 7836.9K |
| $R_{47}$ | −133.9K | $R_{110}$ | 1895.2K |
| $R_{48}$ | −66.9K | $R_{111}$ | 1335.5K |
| $R_{49}$ | −47.0K | $R_{112}$ | 1279.8K |
| $R_{50}$ | −38.2K | $R_{113}$ | 1529.2K |
| $R_{51}$ | −37.4K | $R_{114}$ | 823.5K |
| $R_{52}$ | −43.1K | $R_{115}$ | 1192.5K |
| $R_{53}$ | −65.8K | $R_{116}$ | 2394.5K |
| $R_{54}$ | −345.1K | $R_{117}$ | 73298.1K |
| $R_{55}$ | 77.3K | $R_{118}$ | −3032.9K |
| $R_{56}$ | 32.1K | $R_{119}$ | −1702.0K |
| $R_{57}$ | 19.9K | $R_{120}$ | −1333.5K |
| $R_{58}$ | 14.7K | $R_{121}$ | −1224.8K |
| $R_{59}$ | 12.0K | $R_{122}$ | open |
| $R_{60}$ | 10.6K | | |
| $R_{61}$ | 9.9K | | |
| $R_{62}$ | 9.9K | | |
| $R_{63}$ | 10.6K | | |
| $\hat{R}_{1}$ | open | $\hat{R}_{62}$ | 69.4K |
| $\hat{R}_{2}$ | −4565.5K | $\hat{R}_{63}$ | 23.8K |
| $\hat{R}_{3}$ | −1523.9K | $\hat{R}_{64}$ | 15.1K |
| $\hat{R}_{4}$ | −937.7K | $\hat{R}_{65}$ | 11.8K |
| $\hat{R}_{5}$ | −709.6K | $\hat{R}_{66}$ | 10.4K |
| $\hat{R}_{6}$ | −610.9K | $\hat{R}_{67}$ | 9.9K |
| $\hat{R}_{7}$ | −588.8K | $\hat{R}_{68}$ | 10.3K |
| $\hat{R}_{8}$ | −645.2K | $\hat{R}_{69}$ | 11.4K |
| $\hat{R}_{9}$ | −855.3K | $\hat{R}_{70}$ | 13.5K |
| $\hat{R}_{10}$ | −1270.6K | $\hat{R}_{71}$ | 17.6K |
| $\hat{R}_{11}$ | −2174.5K | $\hat{R}_{72}$ | 25.7K |
| $\hat{R}_{12}$ | −20627.0K | $\hat{R}_{73}$ | 45.3K |
| $\hat{R}_{13}$ | 2936.3K | $\hat{R}_{74}$ | 121.5K |
| $\hat{R}_{14}$ | 1705.2K | $\hat{R}_{75}$ | −628.8K |
| $\hat{R}_{15}$ | 1729.4K | $\hat{R}_{76}$ | −140.3K |
| $\hat{R}_{16}$ | 4168.1K | $\hat{R}_{77}$ | −118.1K |
| $\hat{R}_{17}$ | −2227.1K | $\hat{R}_{78}$ | −161.4K |
| $\hat{R}_{18}$ | −602.1K | $\hat{R}_{79}$ | −765.0K |
| $\hat{R}_{19}$ | −304.8K | $\hat{R}_{80}$ | 200.4K |
| $\hat{R}_{20}$ | −204.3K | $\hat{R}_{81}$ | 87.2K |
| $\hat{R}_{21}$ | −159.5K | $\hat{R}_{82}$ | 58.0K |
| $\hat{R}_{22}$ | −139.7K | $\hat{R}_{83}$ | 46.6K |
| $\hat{R}_{23}$ | −135.7K | $\hat{R}_{84}$ | 42.6K |
| $\hat{R}_{24}$ | −147.6K | $\hat{R}_{85}$ | 43.3K |
| $\hat{R}_{25}$ | −185.6K | $\hat{R}_{86}$ | 48.4K |
| $\hat{R}_{26}$ | −280.8K | $\hat{R}_{87}$ | 60.0K |
| $\hat{R}_{27}$ | −632.7K | $\hat{R}_{88}$ | 84.6K |
| $\hat{R}_{28}$ | 2508.6K | $\hat{R}_{89}$ | 146.5K |
| $\hat{R}_{29}$ | 512.2K | $\hat{R}_{90}$ | 389.1K |
| $\hat{R}_{30}$ | 374.7K | $\hat{R}_{91}$ | −2152.6K |
| $\hat{R}_{31}$ | 449.1K | $\hat{R}_{92}$ | −449.1K |
| $\hat{R}_{32}$ | 2151.8K | $\hat{R}_{93}$ | −374.7K |
| $\hat{R}_{33}$ | −389.1K | $\hat{R}_{94}$ | −512.2K |
| $\hat{R}_{34}$ | −146.5K | $\hat{R}_{95}$ | −2509.7K |
| $\hat{R}_{35}$ | −84.6K | $\hat{R}_{96}$ | 632.6K |
| $\hat{R}_{36}$ | −60.0K | $\hat{R}_{97}$ | 280.8K |
| $\hat{R}_{37}$ | −48.4K | $\hat{R}_{98}$ | 185.6K |
| $\hat{R}_{38}$ | −43.3K | $\hat{R}_{99}$ | 147.6K |
| $\hat{R}_{39}$ | −42.6K | $\hat{R}_{100}$ | 135.7K |
| $\hat{R}_{40}$ | −46.6K | $\hat{R}_{101}$ | 139.7K |
| $\hat{R}_{41}$ | −58.0K | $\hat{R}_{102}$ | 159.5K |
| $\hat{R}_{42}$ | −87.2K | $\hat{R}_{103}$ | 204.3K |
| $\hat{R}_{43}$ | −200.4K | $\hat{R}_{104}$ | 304.8K |
| $\hat{R}_{44}$ | 764.9K | $\hat{R}_{105}$ | 602.0K |
| $\hat{R}_{45}$ | 161.4K | $\hat{R}_{106}$ | 2226.2K |
| $\hat{R}_{46}$ | 118.1K | $\hat{R}_{107}$ | −4171.3K |
| $\hat{R}_{47}$ | 140.3K | $\hat{R}_{108}$ | −1730K |
| $\hat{R}_{48}$ | 628.7K | $\hat{R}_{109}$ | −1705.7K |

-Continued

| | Resistor values | | Resistor values |
|---|---|---|---|
| $\hat{R}_{49}$ | −121.5K | $\hat{R}_{110}$ | −2937.9K |
| $\hat{R}_{50}$ | −45.3K | $\hat{R}_{111}$ | 20548.1K |
| $\hat{R}_{51}$ | −25.7K | $\hat{R}_{112}$ | −2173.6K |
| $\hat{R}_{52}$ | −17.6K | $\hat{R}_{113}$ | 1270.3K |
| $\hat{R}_{53}$ | −13.5K | $\hat{R}_{114}$ | 855.2K |
| $\hat{R}_{54}$ | −11.4K | $\hat{R}_{115}$ | 645.1K |
| $\hat{R}_{55}$ | −10.3K | $\hat{R}_{116}$ | 588.8K |
| $\hat{R}_{56}$ | −10.0K | $\hat{R}_{117}$ | 610.9K |
| $\hat{R}_{57}$ | −10.4K | $\hat{R}_{118}$ | 709.5K |
| $\hat{R}_{58}$ | −11.8K | $\hat{R}_{119}$ | 937.6K |
| $\hat{R}_{59}$ | −15.1K | $\hat{R}_{120}$ | 1523.5K |
| $\hat{R}_{60}$ | −23.8K | $\hat{R}_{121}$ | 4561.6K |
| $\hat{R}_{61}$ | −69.4K | $\hat{R}_{122}$ | open |

It will be appreciated that by varying the resistor values (Coefficients) of digital filter 1*b*, different waveforms can be implemented. Although the invention has been described with reference to an exemplary embodiment thereof, it will be understood by those skilled in the art that variations and modifications in this exemplary embodiment can be effected without departing from the scope and spirit of the invention. For example, the time responses of the digital filter can be forced to approximate the Inverse Fourier and Hilbert transform of a near ideal low-pass filter with arbitrary phase characteristics and such pair of waveforms can be used to generate suppressed carrier single sideband signals.

We claim:

1. A single sideband transmitter for a data communication system, comprising encoder means for receiving a data input, a clock generator, a digital shaping filter, means for connecting the output of said encoder means to said digital shaping filter, a sine-cosine generator, first frequency divider means connected to the output of said clock generator for producing a first, data clock signal for controlling the data output rate of said encoder and a second, digital filter clock signal for controlling said digital filter, second frequency divider means connected to the output of said clock generator means for producing a square wave input to said sine-cosine generator having a frequency which is submultiple of the clock generator frequency and for producing a carrier clock signal for controlling said sine-cosine generator, said digital shaping filter including means for converting the data input thereto from said encoder means into a first and second equally delayed outputs, said first output comprising the Inverse Fourier transform of the response of a substantially ideal lowpass filter to said input from said encoder means and said second output comprising the Inverse Hilbert transform of the response of a substantially ideal low-pass filter to said input from said encoder means, and said sine-cosine generator comprising means for converting the input thereto into a first inphase carrier component comprising a cosine wave signal and a second, quadrature carrier component comprising a sine wave signal, first multiplying means for multiplying said cosine wave signal by the Fourier output of said digital shaping filter to produce a first output and second multiplying means for multiplying signal sine wave by the Hilbert output of said digital shaping filter to produce a second output, and summing means for summing said first and second outputs to produce a single sideband, suppressed carrier modulated signal, said first frequency dividing means comprising a first frequency divider for dividing the clock generator frequency by a first predetermined factor, N, to produce said digital filter clock signal and a second frequency divider for dividing the output of said first frequency divider by a second predetermined factor, N1, so as to produce said data clock signal and said second frequency divider means comprising a third frequency divider for dividing the clock generator frequency by a third predetermined factor, M, to produce said carrier clock signal and a fourth frequency divider for dividing the output of said third frequency divider by a fourth predetermined factor, M1, to produce said input to said sine-cosine generator, said factors being related by the formula $fcMM_1 = fdNN_1$ wherein $fc$ is the carrier frequency and $fd$ is the data rate, said digital shaping filter comprising a shift register having a plurality of register stages serially connected to the output of said data encoder means, means for connecting said digital filter clock signal to each of said shift register stages, first resistor ladder network means for forcing the time response of the register stages to the input to the filter to be the Inverse Fourier transform of a substantially ideal low pass filter, and a second resistor ladder means for forcing the time response of the register stages to the input to the filter to be the Inverse Hilbert transform of a substantially ideal low pass filter, and the said sine-cosine generator comprising a plurality of serially connected shift register stages, means for connecting the carrier clock signal to each said register stage, first resistor ladder means connected to said register stages for producing a cosine wave output and second resistor ladder means connected to said registers for producing a sine wave output, the number of shift register stages being equal to one half the ratio of the carrier clock frequency to the carrier frequency and the values of the resistors for said first ladder network being determined by the formula $Rk_i = 1/(X_{i+1} - X)$ for $i = 1$ to M wherein $X1$, $X2$, $X3 \ldots X2m$ are equi-spaced sample values of the outputs of the shift register stages and R1, R2, R3...R$m$ = the values of the resistors connected to the first through $m$th shift register stage.

2. A transmitter as claimed in claim 1 wherein said multiplying means comprise analog multipliers, wherein first and second R-C smoothing filters are respectively connected between the first output of said digital filter said first multiplying means and between the second output of said digital filter and said second multiplying means and third and fourth R-C smoothing filters are respectively connected between the outputs of said sine-cosine generator and the first and second multiplying means, and wherein a buffer amplifier is connected to the output of each of said R-C smoothing filters.

3. A single sideband transmitter for a data communication system comprising a single digital shaping filter for receiving a data input and for producing a first output comprising the Inverse Fourier transform of the frequency response of a substantially ideal lowpass filter to the input thereto and a second output comprising the Inverse Hilbert transform of the frequency response of a substantially ideal low pass filter to the input thereto, sine-cosine generator means for generating a first, cosine wave output signal and a second, sine wave output signal, multiplying means for multiplying said Fourier output of said digital filter by said cosine wave output signal to produce a first output and for multiplying said Hilbert output of said digital filter by said sine wave output signal to produce a second output, and means for summing the first and second outputs of said multiplying means to produce a single sideband signal, said digital filter comprising means for shaping and truncating the said frequency response in accordance with the window function $fw(t) = K_0 - K_1 \cos[(\pi/T)\, t]$, where $K_0$ and $K_1$ are non-zero constants and the function exists for the period $t = 0$ to $2T$.

4. A transmitter as claimed in claim 3 wherein $K_0 = 0.538$ and $K_1 = 0.462$.

* * * * *

UNITED STATES PATENT OFFICE
CERTIFICATE OF CORRECTION

Patent No. 3,825,834 Dated July 23, 1974

Inventor(s) Richard Stuart and Arvind M. Bhopale

It is certified that error appears in the above-identified patent and that said Letters Patent are hereby corrected as shown below:

Correct name of Assignee on title page to read

--Rixon Electronics, Inc., Silver Spring, Md.--

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*